United States Patent

Evans et al.

[11] Patent Number: 6,081,231
[45] Date of Patent: Jun. 27, 2000

[54] MANUFACTURING INSTALLATION AND PROCESSING OPERATIONS

[75] Inventors: Darrel Evans, Richmond, United Kingdom; Alexander Clyde Kirkwood, Figtree, Australia

[73] Assignee: Heckett Multiserv plc, London, United Kingdom

[21] Appl. No.: 09/101,857

[22] PCT Filed: Jan. 17, 1997

[86] PCT No.: PCT/GB97/00174

§ 371 Date: Jan. 12, 1999

§ 102(e) Date: Jan. 12, 1999

[87] PCT Pub. No.: WO97/26588

PCT Pub. Date: Jul. 24, 1997

[30] Foreign Application Priority Data

Jan. 18, 1996 [GB] United Kingdom .................... 9601010

[51] Int. Cl.[7] .............................. G01S 5/02; H04B 7/185
[52] U.S. Cl. ................................. 342/357.13; 342/357.03; 342/357.06; 342/457; 701/213; 701/215
[58] Field of Search .................... 342/357.01, 357.03, 342/357.06, 357.07, 357.09, 357.13, 457; 701/213, 215

[56] References Cited

U.S. PATENT DOCUMENTS

| | | |
|---|---|---|
| 4,642,017 | 2/1987 | Fenn . |
| 4,956,777 | 9/1990 | Cearley et al. . |
| 4,974,166 | 11/1990 | Maney et al. . |
| 5,317,515 | 5/1994 | Matsuzaki . |
| 5,512,902 | 4/1996 | Guthrie et al. . |
| 5,610,815 | 3/1997 | Gudat et al. . |

FOREIGN PATENT DOCUMENTS

| | | |
|---|---|---|
| 429160 | 5/1991 | European Pat. Off. . |
| 522829 | 1/1993 | European Pat. Off. . |
| 52-7018 | of 1977 | Japan . |
| 60-214009 | of 1985 | Japan . |
| 1070176 | 6/1967 | United Kingdom . |
| 1278929 | 6/1972 | United Kingdom . |
| 1377966 | 12/1974 | United Kingdom . |
| 2090675 | 7/1982 | United Kingdom . |
| 2143395 | 2/1985 | United Kingdom . |
| 2221212 | 1/1990 | United Kingdom . |
| 2283873 | 5/1995 | United Kingdom . |
| WO 95/02318 | 1/1995 | WIPO . |
| WO 95/26522 | 10/1995 | WIPO . |

Primary Examiner—Thomas H. Tarcza
Assistant Examiner—Dao L. Phan
Attorney, Agent, or Firm—David C. Jenkins; Eckert Seamans Cherin & Mellott, LLC

[57] ABSTRACT

The absolute position of a vehicle (V) transporting articles between sites (SS) at an installation, e.g. stations of a steel works, is determined by satellite navigation signal and logged on a CPU with a database to ensure that the intended articles (SR) are processed on different sites as required.

16 Claims, 2 Drawing Sheets

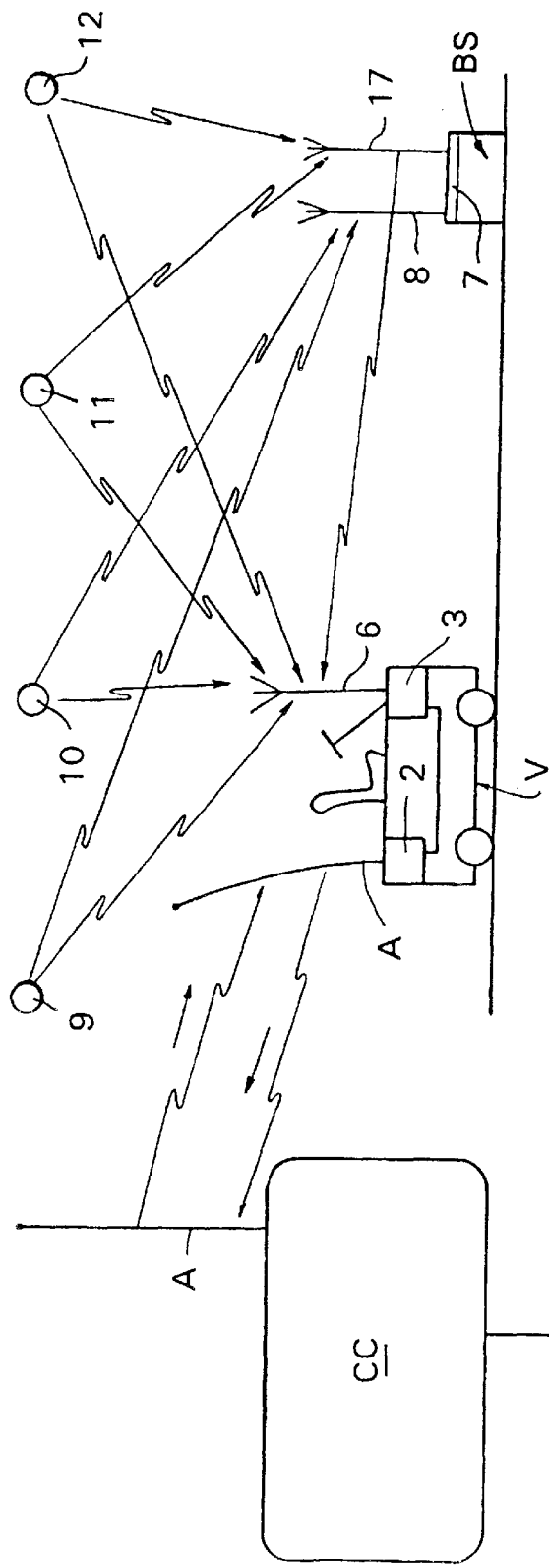
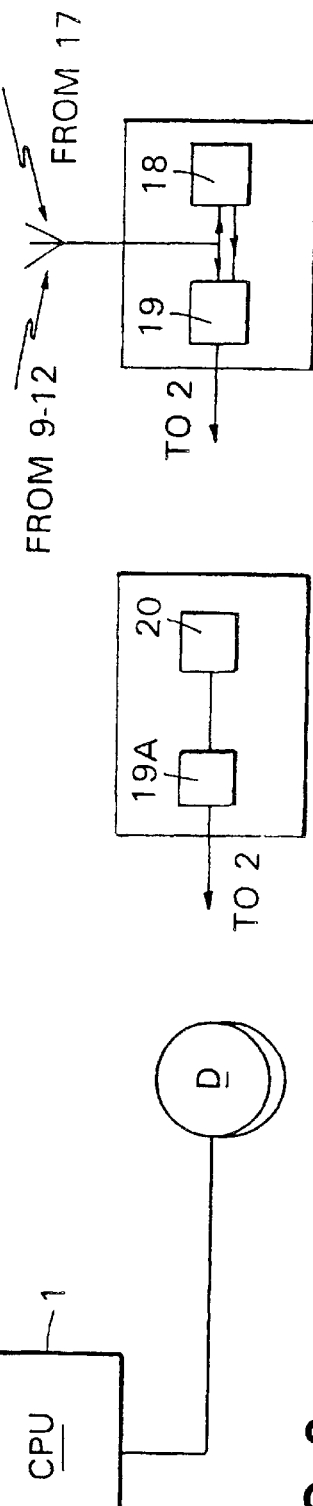
FIG. 2
FIG. 2A
FIG. 2B

MANUFACTURING INSTALLATION AND PROCESSING OPERATIONS

The invention relates to the tracking of batches of articles undergoing successive processing steps in an overall manufacturing process at a manufacturing installation. While the invention is capable of use in a wide variety of contexts, it is seen to good use in the tracking of steel slabs, blooms, billets and the like between the caster and successive rolling mills of a steel mill. For convenience, these pieces will be called by the single word "slabs" herein.

Following the casting of a batch of slabs of steel, metal or other alloy, it is imperative that the steel maker knows exactly what each slab is: what alloying elements it contains; when it was cast; its position within the steel mill, the intended end use or customer; and the like. This information is required for every slab produced and therefore each slab is allocated an identity, usually in the form of a number. The steel maker may want to carry out a number of operations on certain slabs between the caster and the rolling mill, e.g. subdivide or slit them, diffuse hydrogen out of the slab, quality test them, send them straight for export or stock them etc. Therefore each slab must be tracked and the identity must be maintained so as not to lose them or confuse them with other slabs. Due to the high volume of production and the short lead times for steel slabs, a paper record system of logging the position of each slab is not sufficient to allow effective control of the mill. It must of course be appreciated that a steelmill is a large area and that the slabs are stored in yards open to the environment.

U.S. Pat. No. 4,642,017 discloses an automated storage retrieval system for use at a pipe manufacturing facility wherein containers for the pipes are provided with transponders which are interrogated by transmitter/receiver arrangements located on cranes which transport the containers containing the pipes. The results of the interrogation are stored in a computer which also monitors the loading and unloading operations of the cranes and monitors and controls the positions of the cranes on a gantry, such an arrangement requires that identifiable containers are required for the batches of articles to be moved. Furthermore the identities of the batches of articles are not stored.

WO-A-91/10202 (Asyst Technologies Inc.) discloses a manufacturing installation comprising a plurality of processing stations each arranged to perform a processing step on a batch of articles to be manufactured, the installation also having storage stations made up of storage regions, and a vehicle for moving the batches between the processing stations and the storage regions, the installation having a CPU provided with a database and arranged to track the moving of the batches by the vehicle, the installation having identifying code means and reading means arranged to read the identifying code means, the reading means and identifying code means being coupled to the CPU and arranged to automatically update the CPU with the positions of the batches.

Further background prior art is disclosed in GB-A-1377966, U.S. Pat. No. 4,956,777, JP-A52/007018, EP-A-428160, JP-A-60/214009, GB-A-2143395, GB-A-1278929 and GB-A-1070176.

In an earlier patent application PCT/GB95/00640, publication WO95/26522, an arrangement and method for tracking batches of articles (e.g. steel slabs) is disclosed wherein the locations of the batches are stored in a database and the locations are updated by a CPU arranged to receive position signals from a vehicle which transfers the batches between sites at the installation. The position signals are relative position signals obtained by sensing proximity to transponders located at each site and elsewhere on the routes to the sites.

It is one object of the present invention is to provide an arrangement and method which does not require transponders or other local markers which indicate relative position.

In one aspect the invention provides an arrangement for tracking articles between sites at an installation, said the arrangement comprising:

a) at least one steerable vehicle for carrying articles between said sites, said vehicle being provided with absolute position-sensing means for sensing the absolute position of said vehicle, said position sensing means having output means for outputting position signals;

b) receiving means for receiving said position signals, and c) a CPU, said CPU being provided with a database for recording stored positions of said articles, said CPU having an input coupled to said receiving means and having means for updating said database with new stored positions of said articles in response to said position signals.

In another aspect the invention provides a method of tracking articles in an installation, said installation comprising:

a) at least one steerable vehicle for carrying articles between said sites, said vehicle being provided with absolute position-sensing means for sensing the absolute position of said vehicle, said position sensing means having output means for outputting position signals;

b) receiving means for receiving said position signals, and c) a CPU, said CPU being provided with a database for recording stored positions of said articles, said CPU having an input coupled to said receiving means and having means for updating said database with new stored positions of said articles in response to said position signals The absolute position of the vehicle may for example by sensed by a position-sensing means comprising a receiver arranged to receive satellite navigation signals and processing means arranged to determine the absolute position of the vehicle from timing information in the navigation signals.

Preferably the receiver is arranged to receive Global Positioning System (GPS) signals. The GPS is based on a constellation of about 24 high altitude (10,900 nautical miles) satellites which transmit accurately synchronised encoded timing signals An appropriate receiver at an unknown point on the earth's surface can pick up signals from three or more (preferably four) of these satellites and calculate its distance from these satellites and hence its location by comparing the time indicated by its local clock with the transmission times of the received signals. The signals from the fourth satellite is used to correct errors in the receivers clock by applying that correction necessary to ensure that the four computed distances from the receiver to the respective satellites are mutually consistent. This error can be substantially reduced by a refinement known as the Differential Global Positioning System (DGPS) wherein a local stationary receiver at a known location also receives the GPS signals from the satellites and applies a correction to the position signal from the receiver in the unknown location, the correction being that necessary to correct the sensed position of the stationery receiver to its known true position. In a variant of this system, the stationary receiver is positioned at an arbitrary location and a correction signal is derived by comparing its instantaneous sensed position with its averaged sensed position.

The correction applied by the DGPS system compensates for errors due to variations in radio propagation speed resulting from changes in the ionosphere, and relies on the assumption that such variations will be the same for the stationery receiver and the receiver whose position is to be determined.

There is a risk that there will be interference by reflection of satellite navigational signals, e.g. from adjacent buildings. To avoid this shielding means may be provided, e.g. a further antenna, or a dead reckoning system may be incorporated into the system DGPS receivers and associated equipment are commercially available (e.g. from Trimble Navigation Europe, Hampshire UK) and can give position signals with a repeatability of the order of 0.1 meter.

Another means of absolute position sensing is an inertial navigation arrangement e.g. based on integrated circuit accelerometers with means for double-integrating the acceleration signal, i.e. a position in space independent of any local reference.

Further preferred features are defined in the dependent claims.

In a preferred feature, the arrangement includes a CPU having a database which stores the identities of all the slabs by their positions in and around the steel mill or other manufacturing installation. It preferably has an input facility for updating and modifying data and can provide output to produce reports and to monitor progress. (It preferably also has a security system to allow access only to those who require it). This package can be integrated with the caster and rolling mill computers so that the database can receive instructions and confirm execution automatically, without human input.

In operation of a preferred embodiment the CPU will receive instructions from e.g. a casting computer by radio link. The instructions will specify which slabs should be collected by the vehicles and where they are to be taken for storage or subsequent processing. The CPU will calculate the optimum storage site or position for these slabs and the optimum carrier for carrying out the transport, storing the information in the appropriate database. The CPU will transmit a radio signal to the computer interface of the selected vehicle to inform the operator that the slabs should be taken to the calculated optimum storage site. The radio signal will be received by an antenna on the vehicle, then demodulated and the required information displayed on the computer interface. When the vehicle arrives at a slab pile, it will verify its position using its DGPS receiver, and signal this to the CPU. The verification will be displayed by the computer interface within the vehicle. If the actual and instructed positions do not coincide, the computer interface will display that an error has been made, and will automatically update the CPU by a radio signal so that although an incorrect pile has been picked up, the positions of the slabs in either pile are still known. It is possible to override this or any automatic feature of the CPU and this would be flagged in a report printed at the end of every shift.

In the preferred embodiment the vehicle driver then takes the slabs to the assigned station. When the vehicle arrives at that station it will check its position using its DGPS receiver and will transmit a further radio signal corresponding to its position within the mill. Confirmation that this is the correct position will be displayed on the computer interface, and if it is not the correct position the operator will be informed and the CPU updated automatically by radio. In this way every slab may be tracked no matter what an operator does. The position by the DGPS maintains the integrity of the system whilst the immediate updating ensures that the CPU can be interrogated at any time for information concerning a given slab.

The invention has the following additional advantages in the particular context of a steel works:

reducing steel mill inventory. With total slab tracking no slabs will be lost which in turn leads to more efficient casting because many times an entire cast has to be made again even if only one slab is lost;

reducing vehicle movements. This will reduce lead times as slabs are placed in the nearest available position to their next process. This will also increase vehicle efficiency as the CPU identifies and recommends the batch closest to the vehicle as the next batch of articles to transport. This will also reduce the risk of human error, from either caster, rolling mill or other employees.

reducing human input and thus the potential for human error. By electronically verifying the position and identity of slabs these can be automatically updated without any human involvement.

avoiding the need to repair transmitting/receiving apparatus mounted on the vehicle where transponders are used and avoiding the possibility of damage to local position markers (e.g. expensive transponders) which are not required in the present system.

improved rolling. At all time all slabs identities and locations are known. This in turn leads to improvement in rolling schedules.

In order that the invention may be well understood a preferred embodiment will now be described with reference to the accompanying diagrammatic drawings in which:

FIG. 2 is a schematic drawing of the DGPS arrangement;

FIG. 2A shows schematically the processing means and error correcting means of DGPS receiver 3, and FIG. 2B shows a vertical position sensor of an alternative embodiment.

Figure 1:
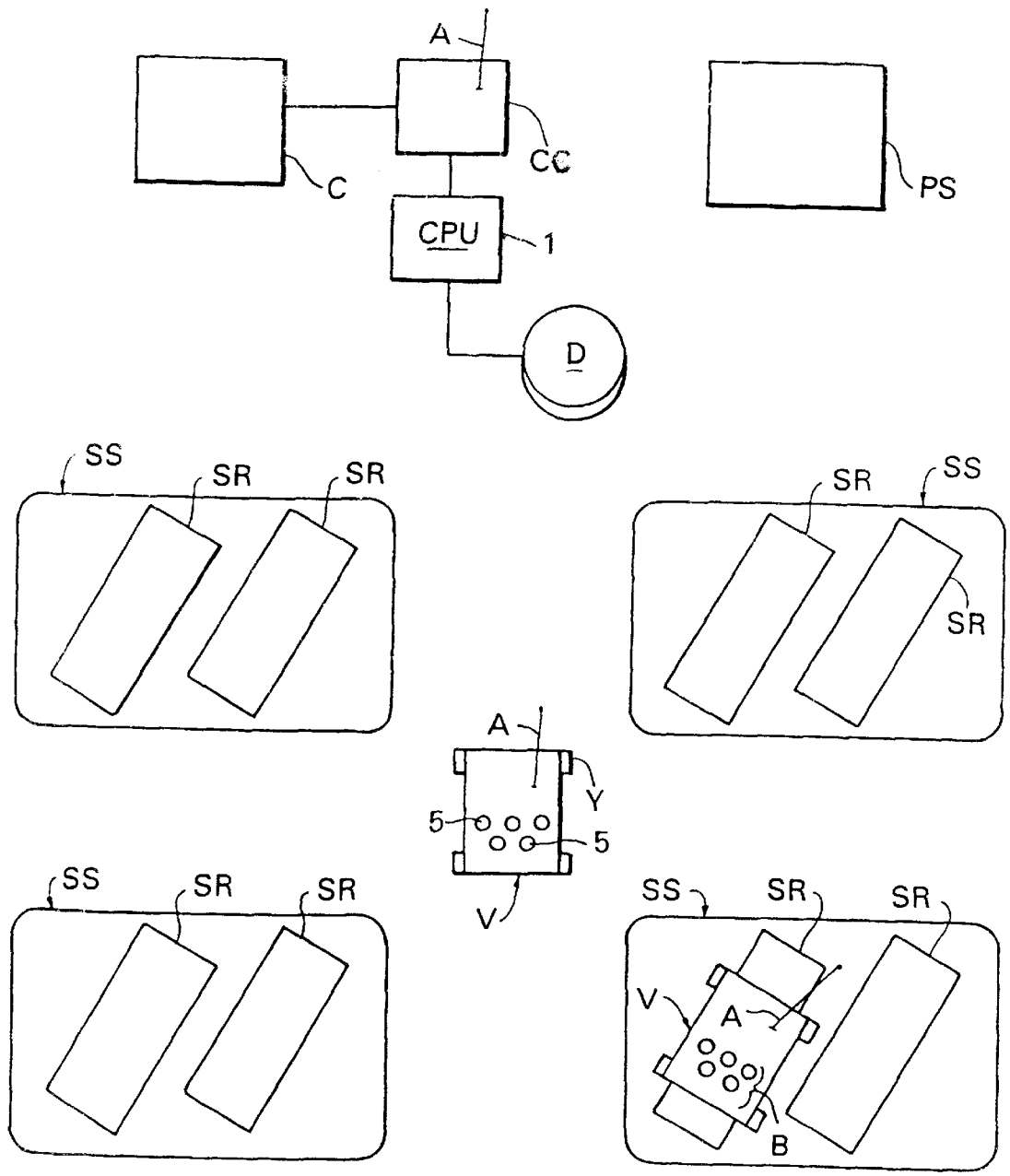
FIG. 1 is a schematic drawing of a steelworks.

In the drawing a casting mould C is arranged to cast a batch B of steel slabs 5 which will require processing at a subsequent processing station PS. (The processing steps may be rolling as in a rolling mill, scarfing, cutting, heat treatment or the like.) Because of the way in which work is handled at a steel mill it is necessary to store batches B of slabs 5 between operations and this is done in one or more storage stations SS which are divided up into storage regions SR which are parking lots for the slabs which are transported between sites using one or more vehicles V.

Vehicle V moves the batches of slabs about the steelworks and is provided with a radio modem 2 linked to a DGPS receiver 3 in the vehicle. DGPS receiver 3 has a receiving antenna 6 which is arranged to receive satellite navigation signals from at least four GPS satellites 9, 10, 11, 12 which are in high altitude orbit and were set up by the US Department of Defence. Receiver 3 sends sensed position signals to a stationary radio modem 2 which transmits the sensed position via antenna A to a further radio modem (not shown) which has a similar antenna A and is coupled to a caster computer CC and optionally also rolling computers (not shown). Our evaluations have established that the accuracy can be less than one meter which is good enough to be considered as an absolute position. Radio modem 2 can also receive destination position signals and other instructions from the radio modem coupled to caster computer CC and can display these instructions on a display (not shown) in the vehicle V.

A CPU 1 is also coupled to the radio modem associated with caster computer CC and maintains a database on hard drive D which stores the updated positions of all the slabs 5.

In operation, as shown in FIG. 2, a radio signal is transmitted from the antenna A associated with CPU 1 to a radio modem 2 coupled to a computer interface 3 of a vehicle V, setting out the code number of the location at which slabs are to be picked up and the corresponding slab identities and the code number of the destination station. For example a batch may need to be moved from a storage area to a processing station. The vehicle then travels to the storage area and on arrival the DGPS receiver 3 sends a radio signal via the radio modem 2 and antenna A to verify the vehicle position. If the sensed position corresponds to the assigned position the operator lifts the slabs and transports them to the destination station. He checks the position of that before depositing the load. He can check his route along the roadways and can identify his location in transit to a central control on request.

The position signals output from DGPS receiver 3 are corrected by an error signal transmitted from a stationary DGPS receiver 7 at a base station BS. This error signal is transmitted to antenna A on vehicle V from a radio modem (not shown) at the base station, via an antenna 8. The signals from DGPS receiver 7 are decoded in module 18 which outputs a position correction signal to processor module 19, which calculates the true position of the vehicle from the DGPS signals received from satellites Q9 to Q12 and from the correction signal. The position signal is output to radio modem 2.

The DGPS receiver 3 may be a DSM™ 8-channel receiver as supplied by Trimble navigation, the radio modems may be TRIOMTALK™ 450 modems from the same manufacturer, and the base station BS may be a GPS PATHFINDER™ base station, also as supplied by Trimble Navigation.

In the alternative embodiment of FIG. 2B, a 3-axis accelerometer 20 replaces the DGPS receiver and sends 3 acceleration signals to a double integrator processor module 19A which outputs a position signal. If the installation is flat 2-axis signals should be sufficient.

The CPU which maintains the database need not be linked to the casting computer CC but may communicate independently with the vehicle V. The database may be maintained by a computer on the vehicle or by the computers of all vehicles in order to provide a multiple backup.

The invention is applicable not only to articles which are identical within each batch but also to batches each comprising a number of different articles, in which case the identities of individual articles can be stored by preserving the relative positions and/or orientations of the articles within each batch as the batch is moved.

What is claimed is:

1. An arrangement for tracking articles, the arrangement comprising at least one steerable vehicle, said steerable vehicle having a determinable absolute position, said vehicle arranged to carry articles between storage positions at an installation, position-sensing means located on the vehicle and arranged to sense the absolute position of the vehicle, and a CPU provided with a database recording the storage positions of the articles, the CPU being arranged to update the database with new storage positions of the articles in response to signals from the position-sensing means.

2. An arrangement according to claim 1 wherein the position-sensing means comprises a receiver arranged to receive satellite navigation signals and processing means arranged to determine the absolute position of the vehicle from timing information in the navigation signals.

3. An arrangement according to claim 2 further comprising a stationary receiver arranged to receive the navigation signals, error-calculating means responsive to an output of the stationary receiver to calculate an error in the satellite navigation signals received by the vehicle's position sensing means and correcting means responsive to the error to apply a correction to the sensed position.

4. An arrangement according to claim 2, wherein the navigation signals are high altitude GPS navigation signals.

5. An arrangement according to claim 2, wherein the position-sensing means further comprises inertial navigation means arranged to update the sensed position of the vehicle during periods of poor or inaccurate reception of the satellite navigation signals.

6. An arrangement according to claim 2, further comprising shielding means arranged to reduce interference by locally reflected satellite navigation signals.

7. An arrangement according to claim 5, wherein the inertial navigation means comprises an accelerometer and means for double integrating an acceleration signal from the accelerometer to determine the position of the vehicle.

8. An arrangement according to claim 7, wherein the vehicle is arranged to update the sensed position on reaching a predetermined reference position.

9. An arrangement according to claim 1, wherein the vehicle is provided with a transmitter arranged to transmit sensed position information to the CPU, which is located off the vehicle.

10. An arrangement according to claim 1, wherein the vehicle is manually steerable.

11. An arrangement according to claim 10, wherein the CPU is arranged to be updated automatically in response to an operator of the vehicle picking up an article from an incorrect location.

12. An arrangement according to claim 1, wherein the installation is a metal handling or processing installation and wherein the articles are metal stock items and/or semi-manufactured metal articles and/or finished metal articles.

13. An arrangement according to claim 12, wherein the installation is a steelworks and a casting computer is arranged to generate and transmit to the CPU instructions concerning movement of batches of the articles.

14. A method of tracking articles at a steelworks, wherein the articles are stored in storage areas and which are moved between said storage areas at the steelworks by a steerable vehicle, which has a determinable absolute position, a CPU having a database containing stored positions of the articles, the method including the step of updating the database with new positions of stored articles in response to signals from a position-sensing means located on and arranged to sense the absolute position of a vehicle.

15. A method according to claim 14, wherein the position-sensing means comprises a receiver arranged to receive satellite navigation signals and processing means arranged to sense the absolute position of the vehicle from timing information in the navigation signals.

16. A method according to claim 15 including the step of correcting an error in the absolute position in dependence upon a signal from a local stationary receiver which is also arranged to receive signal satellite navigation signals.

* * * * *